United States Patent [19]

Kavan

[11] 4,118,143
[45] Oct. 3, 1978

[54] STABILIZING AND CONTROL DEVICE FOR TWO-BLADED HELICOPTER ROTORS

[76] Inventor: Franz Kavan, Lindenaststrasse 56, D-8500 Nuremberg, Germany

[21] Appl. No.: 782,337

[22] Filed: Mar. 29, 1977

[51] Int. Cl.² .................. B64C 27/36; B64C 27/74
[52] U.S. Cl. ....................................... 416/18; 416/31
[58] Field of Search ................ 416/18, 31; 244/17.25, 244/17.13

[56] References Cited

U.S. PATENT DOCUMENTS

| | | | |
|---|---|---|---|
| 2,457,429 | 12/1948 | Young | 416/18 |
| 2,534,353 | 12/1950 | Hiller et al. | 416/18 |
| 2,631,679 | 3/1953 | Hiller et al. | 416/18 |
| 2,827,968 | 3/1958 | Sissingh et al. | 416/18 |
| 3,027,948 | 4/1962 | Goland et al. | 416/18 |
| 3,213,944 | 10/1965 | Nichols et al. | 416/18 X |
| 3,228,478 | 1/1966 | Edenborough | 416/18 |
| 3,520,498 | 7/1970 | Murphy | 416/18 X |
| 4,025,230 | 5/1977 | Kastan | 416/18 |

FOREIGN PATENT DOCUMENTS

| | | | |
|---|---|---|---|
| 2,045,913 | 3/1972 | Fed. Rep. of Germany | 244/17.25 |
| 2,461,122 | 7/1976 | Fed. Rep. of Germany | 416/18 |

*Primary Examiner*—Everette A. Powell, Jr.
*Attorney, Agent, or Firm*—Brady, O'Boyle & Gates

[57] ABSTRACT

A stabilizer bar has an aerodynamically shaped member, such as a winglet, on opposite ends thereof, and the bar is connected to rotate on its longitudinal axis and is mounted to tilt about a pivot axis at right angles thereto connecting it to a rotor shaft that also carries a pair of rotor blades the pitch of which can be changed about their longitudinal axis, that is parallel with the stabilizer bar pivot axis. A pair of oppositely directed mixing levers on opposite sides of the rotor shaft and connected parallel with the stabilizer bar for tilting movement therewith are connected by first control linkages to diametrically opposite sides of a wobble plate assembly, and by second control linkages to vary the pitch of the pair of rotor blades. An arm attached to the stabilizer bar in the plane of the aerodynamically shaped members has an end disposed in alignment with the pivot axis of the stabilizer bar that is connected by a control rod to the wobble plate assembly 90° from the connections of the first control linkages, for cyclic adjustments of the pitch of the aerodynamically shaped members.

5 Claims, 1 Drawing Figure

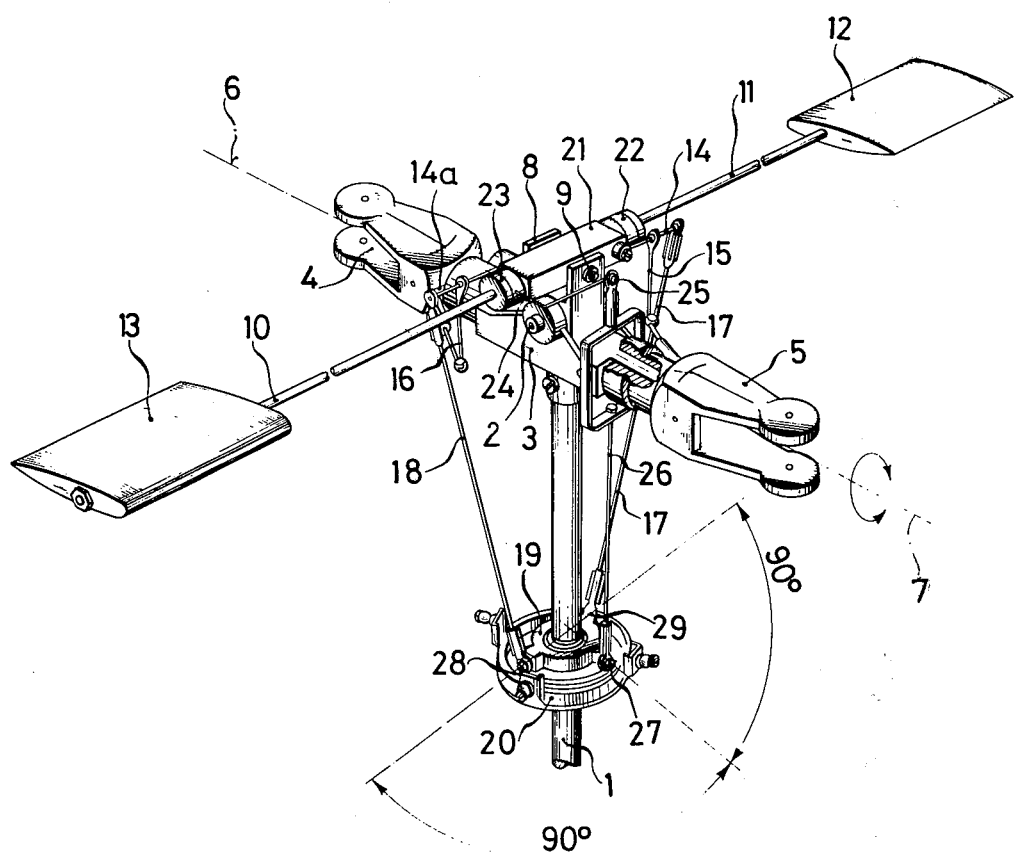

STABILIZING AND CONTROL DEVICE FOR TWO-BLADED HELICOPTER ROTORS

BACKGROUND OF THE INVENTION

The present invention relates to a stabilizing and control device for two bladed helicopter rotors. This device provides for exceptionally good stability of the helicopter.

The prior art already discloses stabilizing and control means for two bladed helicopter rotors comprising a tiltable bar, the central tilt axis of which intersects the axis of the rotor and is disposed parallel to the blade axes and wherein the bar comprises on each side of the rotor axis a mixing lever bar for adjusting the rotor blades via a swash or wobble plate. For example, relatively extensive stabilization is provided by the so-called Young stabilizer of U.S. Pat. No. 2,646,848 to A. M. Young. A continuous blade is employed which is hung on gimbals and which is capable of rotating about its lateral axis in addition to its stroke axis. The plane of rotation of the stabilizing bars according to Young remains in space on account of the gyrostatic action. As a result, the rotor blades are controlled in such a way that a restoring moment is engaged. Extremely good stability is obtained with this position switching system but the helicopter is now very difficult to control. It reacts very sluggishly to the control movement. This disadvantage can be partly eliminated by connecting between the stabilizing bar and the rotor axis dampers which carry the stabilizing bars to a specific extent during tilting of the rotor axis. As a result, the extent of position switching is reduced and a rotation speed modulation is introduced because when the rotor axis is subject to pitching or rolling motions the rotor resultant lags behind the rotor axis. However, this stabilizing action prevents sufficiently simple and effective control. It is difficult to accurately adjust the dampers. Soft dampers provide good stability but reduced controllability. Excessively hard dampers provide poor stability but good control.

U.S. Pat. No. 2,818,123 to S. Hiller, Jr. is also representative of the current state of the art in stabilization of two-bladed teetering rotors by means of mechanical gyro control devices, but this is basically a servo control system.

SUMMARY OF THE INVENTION

The object of the present invention is to obviate the existing disadvantages and, more particularly, to avoid the dampers of the Young stabilizer.

This problem is solved according to the invention in that the bar bears winglets at its ends and is also pivotable about the bar axis in a known manner. It also has an arm attached thereto. This arm is designed for cyclical adjustment of the winglets and is disposed in the plane of the same. The free end of the arm is disposed generally in alignment with the extension of the tilt axis of the bar and is connected to the rotating swash or wobble plate ring by means of a control rod.

As a result, the stabilizing action of the Young bar in respect of external disturbances is retained and high control power is obtained.

BRIEF DESCRIPTION OF THE DRAWING

The drawing shows a diagrammatic perspective and partial sectional view of a stabilizing and control device according to the invention which is designed for a model helicopter.

DESCRIPTION OF THE PREFERRED EMBODIMENT

A balance beam 3 is attached to a motor-driven rotor axis or mast 1. It is disposed at right angles thereto and is pivotally attached to the upper end of the axis 1 at 2. Blades of the usual type (not shown in the figure) are rotatably mounted about their longitudinal axes 6, 7 on the end memebers 4, 5 of the beam 3. A bearing block 8 is disposed above the beam 3 and at right angles to the same. The bearing block 8 pivotally holds a gyrostatic or stabilizer bar 10, 11 which is tiltable about pivot axis 9 which is provided above the beam 3 and at right angles to the same. Attached to the ends of the bar 10, 11 are winglets 12, 13 which provide aerodynamic damping. According to the invention the winglets 12, 13 are in the form of aerodynamic damping and control surfaces. The gyrostatic bar 10, 11 is connected in a known manner, as shown for example, in Patent 3,520,498, issued July 14, 1970, to M. R. Murphy via mixing levers 14 and 14a and by means of control bars 15, 16 respectively connected thereto and to the end members 5 and 4 of the beam 3, which are rotatable about their longitudinal axes relative to beam 3.

The bar 10, 11 is also connected via control bars 17, 18 to the upper, freely rotatable part 19 of a swash or wobble plate ring 20 disposed around rotor axis 1. Control bars 17 and 18 are connected at 29 and 28 to the diametrically opposite sides of rotatable ring 19 of the wobble plate assembly or 180° from each other. As a result, when the non-rotating part 20 of the swash or wobble plate is pivoted by the pilot, by control rods or the like, not shown, in the usual manner, the adjustment angle or pitch of the rotor blades is also directly modified, because the opposite ends of the control bars 17, 18 are connected to the outer ends of the mixing levers 14, 14a.

According to the invention the gyrostatic bar 10, 11 is connected to rotate in body member 21 about its own axis. It is body member 21 that is pivotally connected by pivot axis 9 to bearing block 8, and gyrostatic bar 10, 11 is rotatably connected through the ends of member 21 at right angles to pivot axis 9. Rotation of bar 10, 11 is accomplished by means of adjustment rings 22, 23 rigidly connected to gyrostatic bar portions 11 and 10, respectively. Adjustment ring 23 carries an arm 24 rigidly connected thereto and which branches off at right angles thereto, and which functions as a pitch control lever for bar 10, 11 and winglets 12, 13. The connection portion or free end 25 of arm 24 is disposed generally in registration with or in the extension of the axis of the pivot 9 of the gyrostatic bar 10, 11 and also in the plane formed by the aerodynamically shaped inerta winglets 12, 13. A control rod 26, having an open link surrounding the rotatable axis of the end member 5, leads from the free end 25 to the freely rotatable part 19 of the wobble plate ring 20. With this arrangement the axis of control rod 26 effectively passes through the rotation axis of end member 5 and its associated rotor blade. The lower end of the control rod 26 is pivotally connected at 27 to the freely rotatable part 19 of the wobble plate ring 20 equidistant or 90° from the connections 29 and 28 of control rods 17, 18 thereto. Control rod 26 provides cyclic control inputs from the wobble plate assembly to the winglets 12 and 13 via lever 24 and bar portions 10, 11. With this arrangement the stabilizer bar will no longer lag the tip path plane during control inputs from the swash or wobble plate, but in fact can lead it, contrary to the prior art arrangements. Also, the sluggishness of the prior art arrangement in U.S. Pat. No. 2,818,123 is eliminated because of the direct control of the rotor blades via end members 5 and 4 and mixing levers 14 and 14a. During a wobble plate control command, such as tilting of the plate, there is direct control of blade pitch, and direct control of the stabilizer bar. Cyclic control inputs from the wobble plate assembly are fed to vary the pitch of the main rotor blades through the end members 4 and 5 directly by the primary control bars 17 and 18 via the mixing levers 14 and 14a and the control bars 15 and 16, and indirectly via control rod 26 and lever 24 first into bar cyclic pitch, which will result in bar 10, 11 tilting, and from the bar 10, 11 via mixing levers 14, 14a to the pitch links 15 and 16 to the rotor blade end members 4 and 5. This has the effect of nearly simultaneous precession of the bar and blade gyros which in turn allows a substantial increase of the bar rate feed back ratio (through a change of the mixing ratio at 14, 14a) without loss of control power. This effect permits combination of high control power with high rate damping in a manner not previously possible in prior art structures. Control rod 26 is of no influence on and is independent of the damping, which is determined with the controls (wobble plate) fixed when the helicopter (rotor mast 1) is undergoing pitch and/or roll motions due to external disturbances.

The mechanism of the present invention can be described as an aerodynamically damped gyroscopic stabilizer with direct control of the gyro and the rotor blades. The result is simultaneous achievement of high control power and high damping, which is not achievable in prior art structures. The structure allows for free choice of the stabilizer bar 10, 11 feed back ratio (mechanical lever ratio) at the mixing levers 14 and 14a, determining the amount of rotor blade pitch change in degrees per degree of bar flapping or tilting, i.e. free choice of the amount of gyroscipic rate stabilization without impairment of the control power.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A stabilizing and control device in combination with a two-bladed helicopter rotor connected to and driven by a rotor shaft comprising;
   a swashplate assembly connected around said rotor shaft;
   a tiltable bar;
   said rotor blades having an axis intersecting the axis of said rotor shaft at right angles;
   means pivotally connecting said tiltable bar to said rotor shaft on a pivot axis that intersects the axis of said rotor shaft and is disposed parallel to the axis of said rotor blades;
   a pair of winglets connected on the opposite ends of said tiltable bar;
   said tiltable bar connected for rotation about its longitudinal axis relative to said means and at right angles to the axis of said rotor blades;
   a pair of mixing lever bars connected to said means and extending outwardly in opposite directions on opposite sides of the axis of said rotor shaft and parallel to said tiltable bar;
   first control linkage means connected between said pair of mixing lever bars and said swashplate assembly;
   connecting portions mounting said rotor blades for pitch adjustment about the axis of said rotor blades;
   second control linkage means connected between said pair of mixing lever bars and said connecting portions for adjusting the pitch of said rotor blades;
   an arm connected to rotate said tiltable bar about its longitudinal axis, and having a connecting portion;
   and control rod means connected between said connecting portion and said swashplate assembly for cyclical adjustment of the pitch of said winglets.

2. A stabilizing and control device as set forth in claim 1 in which said swashplate assembly includes a rotating plate member, said first control linkage means connected on opposite sides of said rotating plate member, and said control rod means connected to said rotating plate member approximately 90° from the connection points of said first control linkage means.

3. A stablizing and control device as set forth in claim 1 in which said tiltable bar is connected above said rotor blades.

4. A stabilizing and control device as set forth in claim 1 in which said arm connected to rotate said tiltable bar is disposed in the plane of said winglets, and said connecting portion comprises a free end portion.

5. A stabilizing and control device as set forth in claim 1, in which said connecting portion is disposed in substantial alignment with the vertical plane of the axis of the pivot connection of said tiltable bar of said rotor shaft.

* * * * *